(12) United States Patent
Asai et al.

(10) Patent No.: US 8,451,698 B2
(45) Date of Patent: May 28, 2013

(54) OPTICAL DISK REPRODUCING DEVICE AND OPTICAL DISK RECORDING AND REPRODUCING DEVICE

(75) Inventors: Nobuyuki Asai, Kanagawa (JP); Nobuyoshi Kobayashi, Kanagawa (JP); Yuji Gendai, Kanagawa (JP); Kazumasa Nishimoto, Tokyo (JP); Masaaki Ishihara, Kanagawa (JP); Satoshi Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 36 days.

(21) Appl. No.: 12/801,260

(22) Filed: Jun. 1, 2010

(65) Prior Publication Data

US 2011/0019512 A1 Jan. 27, 2011

(30) Foreign Application Priority Data

Jul. 21, 2009 (JP) ................................. 2009-170044

(51) Int. Cl.
*G11B 7/00* (2006.01)
*G11B 5/09* (2006.01)
*G11B 27/36* (2006.01)

(52) U.S. Cl.
USPC ................ 369/44.29; 369/44.35; 369/44.36; 369/47.25; 369/59.15

(58) Field of Classification Search
USPC .......... 369/44.29, 44.35, 44.36, 47.25, 59.15
See application file for complete search history.

(56) References Cited

U.S. PATENT DOCUMENTS

| | | | | |
|---|---|---|---|---|
| 5,570,335 A * | 10/1996 | Ogata et al. | ............ | 369/124.05 |
| 6,285,634 B1 * | 9/2001 | Abe et al. | ................... | 369/44.11 |
| 6,577,566 B1 * | 6/2003 | Tomita | ....................... | 369/44.26 |
| 6,842,408 B1 * | 1/2005 | Matsumoto | ................ | 369/44.27 |
| 2006/0109770 A1 * | 5/2006 | Ogura et al. | ............ | 369/112.01 |
| 2009/0219797 A1 * | 9/2009 | Tahara et al. | .............. | 369/47.35 |

FOREIGN PATENT DOCUMENTS

| | | |
|---|---|---|
| JP | 05-151589 | 6/1993 |
| JP | 2001-084608 | 3/2001 |

* cited by examiner

*Primary Examiner* — Aneeta Yodichkas
(74) *Attorney, Agent, or Firm* — Rader, Fishman & Grauer PLLC

(57) ABSTRACT

An optical disk reproducing device includes: a signal reproducing section configured to read and decode information recorded on an optical disk by an optical pickup unit, and reproduce the information, wherein the signal reproducing section includes a gain controlled amplifier circuit configured to amplify an radio frequency signal generated from a light receiving element, an automatic gain control circuit configured to control a gain of the gain controlled amplifier circuit, and a signal processing section configured to derive a part of an automatic gain control value generated in the automatic gain control circuit, and generate a control signal for adjusting one of an optical system path and a detection system path for controlling the optical pickup unit.

12 Claims, 7 Drawing Sheets

F I G. 1
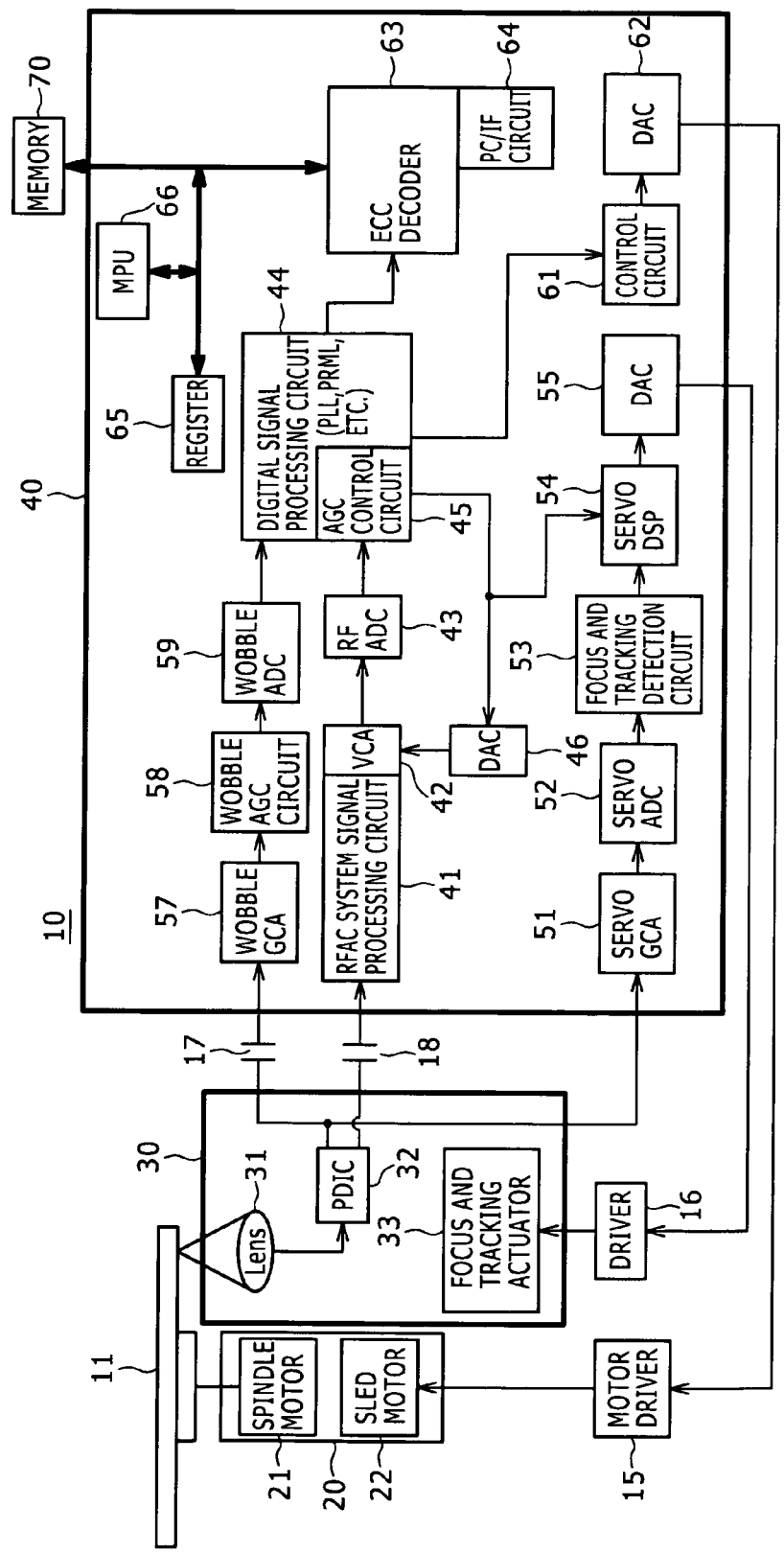

OPTICAL DISK REPRODUCING DEVICE AND OPTICAL DISK RECORDING AND REPRODUCING DEVICE

BACKGROUND OF THE INVENTION

1. Field of the Invention

The present invention relates to an optical disk reproducing device and an optical disk recording and reproducing device, and particularly to a method of making adjustment of one of an optical system and a detection system, especially focus bias adjustment, with the amplitude of a reproduced signal (hereinafter referred to as an RF signal) as an index while reproducing operation is continued without being interrupted. The optical disk reproducing device and the optical disk recording and reproducing device will hereinafter be referred to collectively as an optical disk drive, and performing reproducing operation without interrupting the reproducing operation will hereinafter be referred to as running.

2. Description of the Related Art

The optical disk drive generally causes a shift in operation center such as a focus bias or the like due to an environmental change such as a temperature rise or the like at the time of continuous operation. As a result, a reproduction margin is narrowed. It is thus desirable to perform the adjustment during the running.

However, in the current optical disk drive, the adjustment always involves an interruption of reproducing operation. As a result, the average transfer rate of the optical disk drive is decreased.

The optical disk drive has at least a reproduced signal processing device. The reproduced signal processing device has an AGC (automatic gain control) circuit for holding an RF (radio frequency) amplitude constant.

The current optical disk drive has an RF amplitude detecting circuit for making focus bias adjustment with maximization of the RF amplitude as an index, and is configured such that a controlling MCU (microprocessor control unit) can obtain the output of the RF amplitude detecting circuit. Incidentally, the RF amplitude in this case refers to the amplitude of the above-described RF signal.

It is generally known that a method of measuring the RF amplitude is performed as a method of focus bias adjustment (focus fine adjustment) of the optical disk drive, and that the focus bias adjustment is made on the basis of the RF amplitude.

In related art, the absolute value of the RF amplitude is measured to measure the RF amplitude. It is therefore necessary to turn off an automatic amplitude adjusting function (AGC). Thus, in related art, in order to make focus bias adjustment, it is necessary to turn off the AGC and interrupt reproducing operation.

An optimum focus bias value changes according to a temperature rise within the drive and other environmental variations. In the existing techniques, when focus bias adjustment is made, reproducing operation needs to be interrupted. The interruption of the reproduction may lead to degradation in drive readout performance (readout speed or the like).

Japanese Patent Laid-Open No. 2001-84608 (hereinafter referred to as Patent Document 1) describes an offline adjusting method. The present embodiment discloses a configuration enabling similar adjustment without interrupting reproducing operation.

Japanese Patent Laid-Open No. Hei 5-151589 discloses a configuration that makes focus adjustment on the basis of an RF amplitude.

SUMMARY OF THE INVENTION

However, to obtain the absolute value of an RF amplitude changing in such a manner as to be interlocked with a focus bias, which RF amplitude can be used for the above-described adjustment, inevitably demands the operation of an AGC circuit to be stopped, and consequently always involves the interruption of reproducing operation.

The AGC circuit includes a VCA (variable gain controlled circuit), and is configured as a negative feedback control type that converges the RF amplitude to a predetermined value. The control signal of the VCA is therefore inversely proportional to the value of the RF amplitude (or the dB converted value of the RF amplitude).

Thus, by obtaining the control signal of the VCA, a change in level of the RF amplitude can be detected in real time while the AGC circuit remains operated. The present embodiment has been made directing attention to this point.

An optical disk reproducing device according to an embodiment of the present invention is an optical disk reproducing device including a signal reproducing section for reading and decoding information recorded on an optical disk by an optical pickup unit, and reproducing the information. The signal reproducing section includes a gain controlled amplifier circuit for amplifying an RF signal generated from a light receiving element, an AGC circuit for controlling a gain of the gain controlled amplifier circuit, and a signal processing section for deriving a part of an AGC control value generated in the AGC circuit, and generating a control signal for adjusting one of an optical system path and a detection system path for controlling the optical pickup unit.

An optical disk recording and reproducing device according to an embodiment of the present invention is an optical disk recording and reproducing device including: a signal recording section for writing encoded information to an optical disk by an optical pickup unit; and a signal reproducing section for reading and decoding information recorded on the optical disk and reproducing the information. The signal reproducing section includes a gain controlled amplifier circuit for amplifying an RF signal generated from a light receiving element, an AGC circuit for controlling a gain of the gain controlled amplifier circuit, and a signal processing section for deriving a part of an AGC control value generated in the AGC circuit, and generating a control signal for adjusting one of an optical system path and a detection system path for controlling the optical pickup unit.

In the present embodiment, the RF signal derived from the optical pickup is compared with a target RF value, an AGC control amplitude is obtained from a difference signal obtained as a result of the comparison, the gain controlled amplifier circuit for amplifying the RF signal is controlled by the AGC control amplitude, and the controlled RF signal is output to a demodulating circuit. A focus bias value for controlling the optical pickup is obtained from the AGC control value for controlling the gain controlled amplifier circuit to adjust a focus bias.

According to the present embodiment, focus bias adjustment can be made during reproduction, and an improvement in readability can be expected. In addition, a focus error adjusting block can be implemented by only a small addition in terms of hardware.

Adjustment based on an AGC control value is an adjustment based on a relative value, and is a search for an extremum. Variation in AGC control value which variation is dependent on the device does not present a problem. Thus accurate adjustment can be made without depending on the device variation.

BRIEF DESCRIPTION OF THE DRAWINGS

FIG. 1 is a diagram of a block configuration of an optical disk recording and reproducing device according to an embodiment of the present invention;

DETAILED DESCRIPTION OF THE PREFERRED EMBODIMENT

Figure 2:
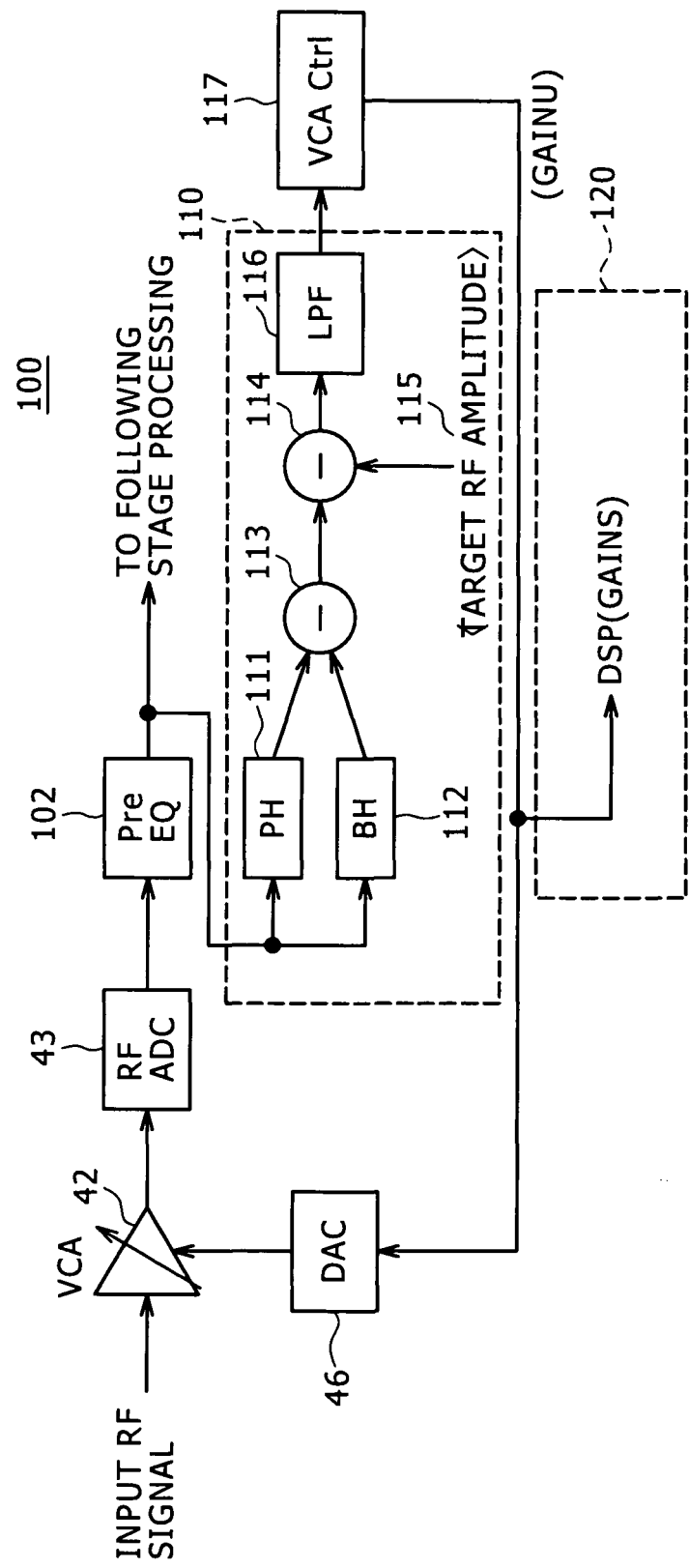
FIG. 2 is a diagram of a block configuration of VCA control.

The mode for carrying out the invention will be described in the following order.
1. Description of General Configuration and Operation of Optical Disk Recording and Reproducing Device
2. Description of Block Configuration of Focus Error Control System and Operation of Each Block
3. Description of Operation of Focus Servo System <1. Description of General Configuration and Operation of Optical Disk Recording and Reproducing Device>

Description will be made in the following of an optical disk recording and reproducing device. However, the following description can be applied to an optical disk reproducing device having only a reproducing device.

FIG. 1 shows a block configuration of an optical disk recording and reproducing device 10. The optical disk recording and reproducing device 10 includes a motor driver 15, a driver 16 for focus and tracking, a motor driving control section 20, an optical pickup unit (OPU) 30, a signal processing section 40, a memory 70, and the like.

The motor driving control section 20 includes a spindle motor 21 for controlling the rotation of an optical disk 11 and a sled motor 22 for controlling the position of the optical pickup unit 30.

The optical pickup unit 30 includes an objective lens (Lens) 31, a PD (photodetector) IC 32, and a focus and tracking actuator 33. The above-described PDIC 32 includes a photodiode, an operational amplifier and the like not shown in the figure.

The output of the optical pickup unit 30 is connected to the input of the signal processing section 40 via a flexible cable or the like and coupling capacitors 17 and 18.

The PDIC 32 obtaining an electric signal from reflected light from the optical disk 11 uses for example a four-division type photodiode. The PDIC 32 outputs signals A, B, C, and D as four output signals of the photodiode. In addition, the PDIC 32 outputs an addition signal A+B+C+D as an RF signal.

In a signal processing system of the signal processing section 40, an RF signal processing system includes an RFAC system signal processing circuit 41, a VCA 42, and an RFADC 43. A digital signal system for demodulating a digitized signal includes a digital signal processing circuit 44, an AGC control (circuit) 45, a DAC 46, an ECC decoder 63, a PC/IF (computer interface) circuit 64, a register 65, and an MPU 66.

A servo control system of the signal processing section 40 includes a wobble GCA 57, a wobble AGC circuit 58, a wobble ADC 59, a servo GCA 51, a servo ADC 52, a focus and tracking detection circuit 53, a servo DSP 54, a DAC 55, a control circuit 61, and a DAC 62.

Also, in the optical disk recording and reproducing device 10, the memory 70 connected to the ECC decoder 63, the register 65, and the MPU (microprocessor unit) 66 is formed in addition to the signal processing section 40.

Further, the motor driver 15 for controlling the motor driving control section 20 and the driver 16 for controlling the optical pickup unit 30 are formed.

While blocks related to a reproducing device in the optical disk recording and reproducing device 10 are principally shown in the figure, an encoding circuit, a modulating circuit, an ECC encoder circuit, an APC circuit and the like not shown in the figure for performing a writing operation are also formed.

A groove meandering on the basis of absolute time information is formed in the optical disk 11. A wobble signal modulated by information such as addresses or the like is recorded along the groove, and recorded information is read along the groove. The optical disk 11 is rotated on the spindle motor 21 at a constant linear velocity (CLV) or a constant angular velocity (CAV) in synchronism with the above-described wobble signal while the tracking and focus of the optical disk 11 are adjusted.

The optical pickup unit 30 is provided so as to be opposed to the optical disk 11 to record information or reproduce information on the optical disk 11. A laser diode not shown in the figure and the PDIC 32 are disposed in the optical pickup unit 30. During the recording of information, the optical disk 11 is irradiated with light output from the laser diode via the objective lens 31, and thereby the information is written.

At a time of reproduction of information, the information recorded on the optical disk 11 is input as reflected light to the PDIC 32 via the objective lens 31. In the PDIC 32, four signals A to D are generated by the four-division photodiode. The PDIC 32 outputs these signals A to D and an RF signal obtained by adding together the signals A to D.

The RF signal is decoded, whereby information such as a video (image) and audio signal or the like is reproduced. In addition, control signals such as a wobble signal, a focus signal, a tracking signal and the like are generated using the above-described signals A to D. Also at a time of recording information, a wobble signal, a focus signal, a tracking signal and the like are generated on the basis of the signals A to D.

The RF signal output from the PDIC 32 is supplied to the RFAC system signal processing circuit 41, set to a fixed signal level by the VCA 42 after being subjected to a binarizing process, and then supplied to the RFADC 43 in a next stage, where the analog RF signal is converted into a digital signal. The RFAC signal is subjected to the A/D conversion in the RFADC 43, and then output to the digital signal processing circuit 44.

The digital signal processing circuit 44 performs demodulation such as PRML processing, 1-7PP demodulation, 8-16 demodulation, EFM and the like. The ECC decoder 63 makes error correction. PRML stands for Partial Response Maximum Likelihood. The PP of 1-7PP stands for Parity preserve/Prohibit RMTR. EFM stands for Eight to Fourteen Modulation.

Digital data error-corrected by the ECC decoder 63 is sent from the PC/IF circuit 64 to a host PC not shown in the figure or the like. The host PC or the like performs decoding processing related to MPEG2, AC-3 or the like.

A binarized signal is generated from each of the analog signals A to D output from the PDIC 32, the binarized signal is subjected to logical operation, and a sampling pulse for S/H is generated. The wobble GCA 57 controls the amplitude level of an original wobble signal generated on the basis of the signals A to D to convert the original wobble signal into an accurate wobble signal. The wobble AGC circuit 58 performs AGC processing and the like.

The gain-controlled wobble signal is converted into a digital signal by the wobble ADC 59. The digital signal is output to the digital signal processing circuit 44, demodulated and decoded, and thereafter subjected to a decoding process for obtaining an address.

The AGC control circuit 45 generates a control signal from the digital RF signal resulting from the demodulation processing in the digital signal processing circuit 44, and then outputs the control signal to the DAC 46. The DAC 46 converts the control signal into an analog signal (voltage), and then supplies the control signal to the VCA 42. As a result, the VCA 42 controls the amplitude level of the input RF signal.

That is, the RF signal is controlled by a circuit formed by a negative feedback AGC loop of the VCA 42, the RFADC 43, the AGC control circuit 45, and the DAC 46.

Meanwhile, as for a servo signal generated on the basis of the signals A to D output from the PDIC 32, an amplitude-controlled output signal is derived from the servo GCA 51. The servo signal controlled in amplitude by the servo GCA 51 is converted into a digital signal by the servo ADC. The focus and tracking detection circuit 53 detects a focus and tracking signal and the like for controlling the optical pickup unit 30 from the converted servo signal, and then outputs the focus and tracking signal and the like to the servo DSP 54.

The detected focus and tracking signal and the like and the AGC control signal generated by the AGC control circuit 45 forming a part of the digital signal processing circuit 44 are supplied to the servo DSP 54. The focus and tracking signal is controlled according to the AGC control signal.

The focus and tracking signal output from the servo DSP 54 is supplied to the DAC 55, where the focus and tracking signal is converted from a digital signal to an analog signal. The analog signal is then output to the driver 16.

The driver 16 controls the focus and tracking actuator 33 according to the control signal supplied from the DAC 55 to perform focus and tracking control. This focus and tracking control will be described later in detail.

Meanwhile, in order to control the motor driving control section 20, a control signal for controlling the sled motor 22 is supplied from the digital signal processing circuit 44 to the control circuit 61, where a control signal is generated. This control signal is supplied to the DAC 62, where the control signal is converted from a digital signal to an analog signal. The analog signal is supplied to the motor driver 15.

The control signal output from the motor driver 15 is output to the motor driving control section 20. As a result, the spindle motor 21 and the sled motor 22 are controlled, and the linear velocity or the rotational angular velocity of the optical disk 11 is adjusted to be constant.

A writing operation of the optical disk recording and reproducing device 10 will next be described.

The host PC or the like not shown in the figure encodes an audio signal and a video signal into a digital signal as a result of information compression of AC-3 or MPEG2, for example, subjects the digital signal to encryption and the like after packetization, and then supplies the digital signal as digital data to the PC/IF circuit 64.

An ECC encoder adds an ECC to the above-described digital data input from the PC/IF circuit 64, then encodes the digital data into a predetermined physical format of an optical disk, for example a Blu-ray (registered trademark) Disc format, and thereafter subjects the digital data to encoding of 1-7PP or the like.

The encoded digital signal is subjected to a modulation that is recording-compensated by a multi-pulse modulation system or the like in a write strategy circuit for performing laser diode modulation, and then supplied to the laser diode via an LD driver. Then, the optical disk 11 is irradiated with laser light corresponding to the on/off state of the modulated pulse supplied to the laser diode via the objective lens 31, whereby information is recorded.

In addition, a monitoring circuit not shown in the figure detects reflected light reflected from the optical disk 11, and outputs the detected value to an APC circuit. The APC circuit obtains a control signal for setting the power of the laser diode at a time of writing to a predetermined value on the basis of the detected value. The APC circuit outputs the control signal to the LD driver. As a result, the LD driver controls the modulated pulse output from a write strategy, and optimizes the writing power of the laser diode.

<2. Description of VCA Control Block Configuration and Operation of VCA Control Block Configuration>

[VCA Control Block Configuration]

Next, FIG. 2 shows a concrete configuration of a VCA control block according to an embodiment of the present invention.

A VCA control block 100 shown in FIG. 2 is a feedback circuit for performing a normal AGC operation, and is also a circuit for deriving an RF signal for a focus bias.

Incidentally, the VCA control block 100 of FIG. 2 corresponds to a feedback loop formed by the VCA 42, the RFADC 43, the AGC control circuit 45, and the DAC 46 in a stage succeeding the RFAC system signal processing circuit 41 shown in FIG. 1.

A concrete configuration of the VCA control block 100 includes the VCA 42, the RFADC 43, a PreEQ 102, a PH (circuit) 111, a BH (circuit) 112, subtracters 113 and 114, an LPF 116, a VCA Ctrl 117, and the DAC 46. Further, a DSP (digital signal processor) 120 is formed as a section for deriving an RF signal for focus bias adjustment. The PreEQ 102 represents a digital filter. The PH circuit 111 represents a peak hold circuit. The BH circuit 112 represents a bottom hold circuit. The LPF 116 represents a low-pass filter. Incidentally, in FIG. 2, the same circuit blocks as in FIG. 1 are identified by the same reference numerals.

The VCA 42 and the RFADC 43 have been described with reference to FIG. 1, and thus description thereof will be omitted in the following. In the case of BD, recording density is higher than that of CD (Compact Disc) and DVD (Digital Versatile Disc), and thus frequency characteristics are adjusted by the PreEQ 102.

The PH circuit 111 measures a digitized RF signal output from the PreEQ 102 for a predetermined period, and detects and holds a peak (maximum) value in the period.

The BH circuit 112 measures the digitized RF signal output from the PreEQ 102 for the predetermined period, and detects and holds a bottom (minimum) value in the period.

The subtracter 113 subjects the peak value supplied from the PH circuit 111 and the bottom value supplied from the BH circuit 112 to arithmetic processing, and outputs a difference between the two values. This difference signal corresponds to a maximum value of amplitude of the RF signal.

The subtracter 114 is supplied with the maximum amplitude (corresponding to the peak-to-bottom value) of the RF signal which maximum amplitude is output from the subtracter 113 and a target RF amplitude (115). The subtracter 114 outputs a difference from the value of the target RF amplitude (115). The low-frequency band of the difference (signal) is passed through by the LPF 116, and a high-frequency signal, noise and the like are removed.

The VCA Ctrl 117 generates a VCA Ctrl signal for controlling the VCA 42. Then, the DAC 46 converts an amplitude control signal GAINU output from the VCA Ctrl 117 from a digital signal to an analog signal (voltage).

This analog converted signal is supplied as a control signal to the control terminal of the VCA 42 to control the gain of the VCA 42, whereby the amplitude of the analog RF signal input to the VCA 42 is controlled.

In addition, a part of the output signal of the VCA Ctrl 117 is output as a focus adjusting signal to the DSP 120. Thereby an amplitude control signal GAINS for focus adjustment is obtained during the AGC operation for the RF signal in parallel with the AGC operation. A method of deriving the amplitude control signal GAINS will be described later in detail.

Specifically, the DSP 120 may be configured by hardware, or may be configured to perform predetermined operation according to a control program using an MPU (microprocessing unit; microcomputer), or may be implemented by using both.

[Description of Operation of VCA Control Block]

Next, description will be made of operation of the VCA control block shown in FIG. 2.

The VCA 42 amplifies an input RF signal as an analog signal according to the instruction of the amplitude control signal (GAINU). The RFADC 43 converts the amplified RF signal from the analog signal to a digital signal with a predetermined bit precision. The PreEQ (waveform equalizer) 102 adjusts the frequency characteristics of the converted digital RF signal.

The RF signal output from the PreEQ 102 is supplied to the PH circuit 111 and the BH circuit 112 to obtain a PH value and a BH value. These values are supplied to the subtracter 113 to obtain the maximum amplitude value of the RF signal. The maximum amplitude value of the RF signal is set as amplitude information of the input RF signal. The subtracter 114 generates a difference between the maximum amplitude value and the target RF amplitude. The difference information is supplied to the LPF 116 to remove high frequencies and noise. An output signal derived from the LPF 116 is supplied to the VCA Ctrl 117. The VCA Ctrl 117 generates an amplitude control signal (GAINU).

The amplitude control signal (GAINU) is supplied to the DAC 46 and the DSP 120. The gain of the VCA 42 is controlled by a control voltage converted into an analog signal by the DAC 46.

Thus, the amplitude control signal (GAINU) output from the VCA Ctrl 117 is the control signal of an automatic amplitude adjusting function (AGC). The amplitude control signal (GAINU) is also supplied from the VCA Ctrl 117 to the DSP 120, and is subjected to arithmetic processing, whereby an amplitude control signal GAINS is derived. This amplitude control signal GAINS is the same signal as the amplitude control signal GAINU which same signal is extracted for observation. Each of the amplitude control signals GAINU and GAINS is large when the input RF signal is small, and is small when the input RF signal is large.

Thus, an input RF signal amplitude and input RF signal information can be obtained by the amplitude control signal GAINS while the AGC is operated during reproduction.

In addition, the above-described DSP 120 generates the amplitude control signal GAINS for focus adjustment using the amplitude control signal (GAINU) generated in the AGC feedback system. This will be described later in detail.

Figure 3:
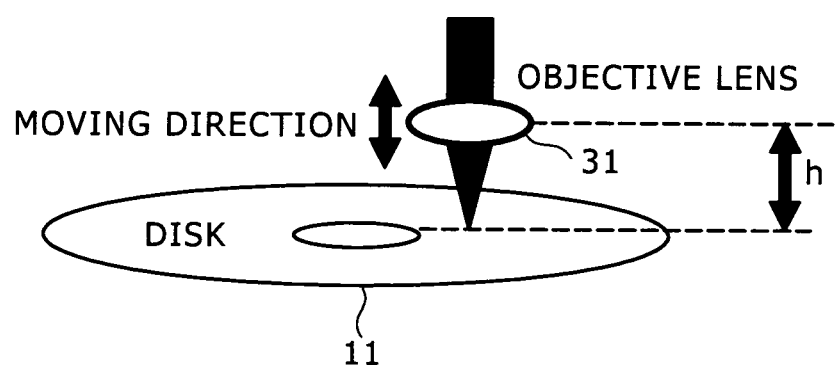
FIG. 3 is a schematic diagram showing relation between a disk and an objective lens in focus adjustment.

FIG. 3 schematically illustrates relation between a disk and an objective lens.

Focus bias adjustment finely adjusts the position in a focus direction of the objective lens 31 with respect to the optical disk 11.

The fine adjustment is to correct the steady-state deviation of a focus servo loop (including the offset of each device). The steady-state deviation changes due to external factors such as temperature and the like.

The objective lens 31 is moved in a vertical direction (moving direction) while made to follow the rotation of the optical disk 11 such that a distance "h" between the optical disk 11 and the objective lens 31, that is, a focal length agrees irrespective of the above-described external factors.

[Configuration of Focus Servo System]

Figure 4:
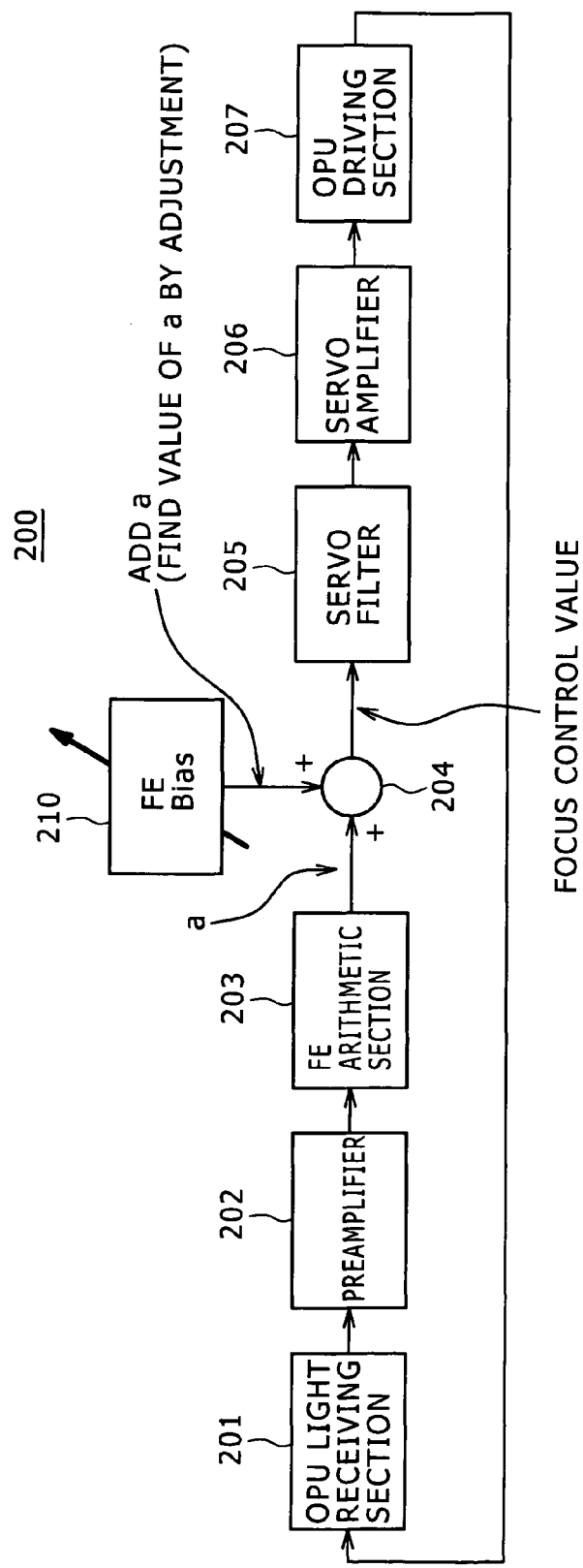
FIG. 4 is a diagram of a block configuration of a focus servo system.

Next, FIG. 4 shows an example of configuration of a focus servo system.

The focus servo system 200 includes an OPU (optical pickup unit) light receiving section 201, a preamplifier 202, an FE (focus error) arithmetic section 203, a servo filter 205, a servo amplifier 206, an OPU driving section 207, and an FE Bias 210.

The OPU light receiving section 201 and the preamplifier 202 are formed in the optical pickup unit (OPU) 30. As described with reference to FIG. 1, the optical pickup unit 30 includes the objective lens (Lens) 31, the PDIC (photodetector IC) 32, and the focus and tracking actuator 33.

The OPU light receiving section 201 and the preamplifier 202 correspond to the PDIC 32, for example, and are formed by a photodiode and a plurality of operational amplifiers not shown in the figure.

The FE arithmetic section 203 corresponds to the focus and tracking detection circuit 53 in FIG. 1. The FE arithmetic section 203 calculates a focus error using four signals A, B, C, and D output from the four-division type photodiode (PD).

For example, the focus error is derived by calculating a difference between opposed signal outputs A+C and B+D of four divided photodiodes.

An adder 204 calculates a sum of a signal (focus error signal) output from the FE arithmetic section 203 and a signal (data) output from the FE Bias (section) 210, and generates a focus control signal.

The servo filter 205 performs frequency loop band limitation and phase compensation. The servo filter 205 is set to a frequency characteristic capable of following for example runout in a surface direction of the disk. The servo filter 205 is typically formed with an LPF characteristic.

The servo amplifier 206 amplifies the focus control signal.

The OPU driving section 207 further amplifies the focus control signal amplified by the servo amplifier 206 to a level capable of driving the OPU.

Incidentally, the focus bias value output from the FE Bias 210 corresponds to the control signal output from the above-described DSP 120. The focus bias value is obtained as an extremum from relation between GAINS and the focus bias value from a bathtub curve (characteristic curve) to be described later.

[Operation of Focus Servo System]

Operation of the focus servo system will next be described.

Signals A, B, C, and D are derived from the photodiode receiving light in the OPU light receiving section 201, and amplified by the preamplifier 202. The amplified signals A, B, C, and D are input to the FE arithmetic section 203, where calculation of Signal (A+C)−Signal (B+D) is performed. This difference signal is derived as an FE (focus error) signal.

A sum of the FE signal output from the FE arithmetic section 203 and the data output from the FE Bias 210 is derived by the adder 204 to drive the OPU 30 via the servo filter 205, the servo amplifier 206, and the OPU driving section 207.

The OPU 30 is driven by a voltage shifted from a target value, and the objective lens 31 moves in the vertical direction. The OPU light receiving section 201 is irradiated with laser light reflected from the optical disk 11 at the time of the movement. The output signals A, B, C, and D of the photodiode accordingly change in level. Thereafter, a similar operation is performed so that the target value of the FE Bias 210 which value is supplied to the adder 204 is attained, that is, until the RF amplitude becomes a maximum.

Thus, focus bias operation (adjustment) is achieved by injecting the focus bias value (FE Bias in FIG. 4) as an offset value into the focus servo loop. This focus bias value (FE Bias) is determined by extracting an optimum value using some method in a system. Incidentally, this FE Bias will be described later in detail.

[Configuration of Focus Bias Adjusting System]

A focus bias adjusting system will next be described.

Figure 5:
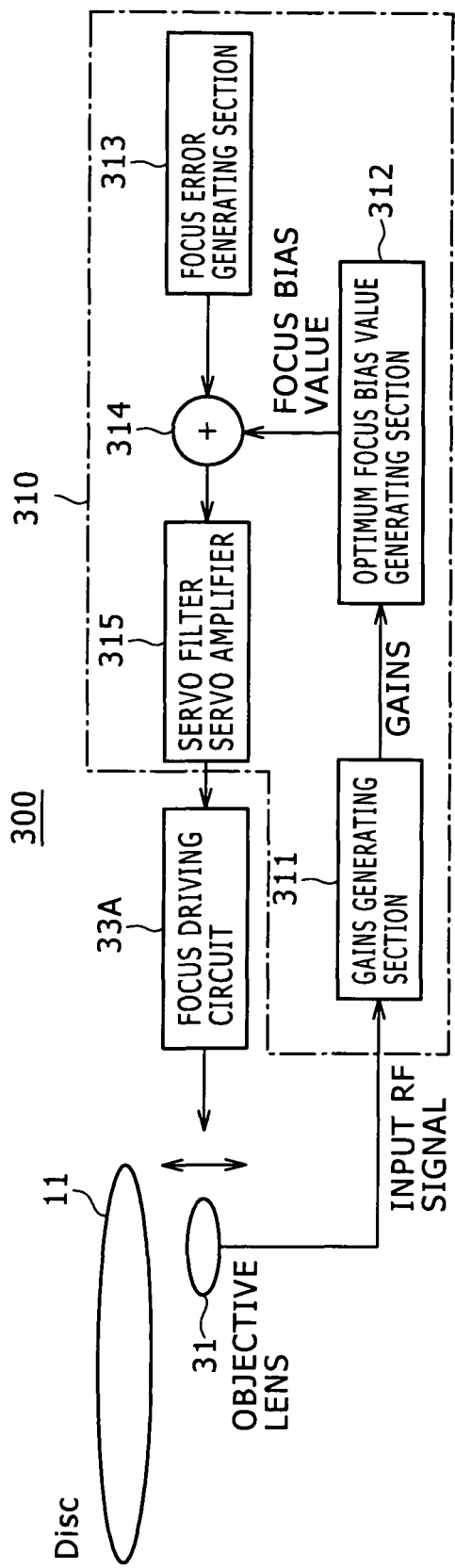
FIG. 5 is a block diagram showing a focus bias adjustment system.

FIG. 5 shows an example of configuration of the focus bias adjusting system 300.

The focus bias adjusting system 300 includes a focus driving circuit 33A, a GAINS generating section 311, an optimum focus bias value generating section 312, a focus error generating section 313, an adder 314, and a focus control signal generating section 315.

In this configuration, for example the GAINS generating section 311, the optimum focus bias value generating section 312, the focus error generating section 313, the adder 314, and the focus control signal generating section 315 can be formed by a DSP (310). In addition, it is possible to configure a part functioning in the DSP 120 by hardware, and configure the other part by a CPU (microcomputer) or the like.

Figure 6:
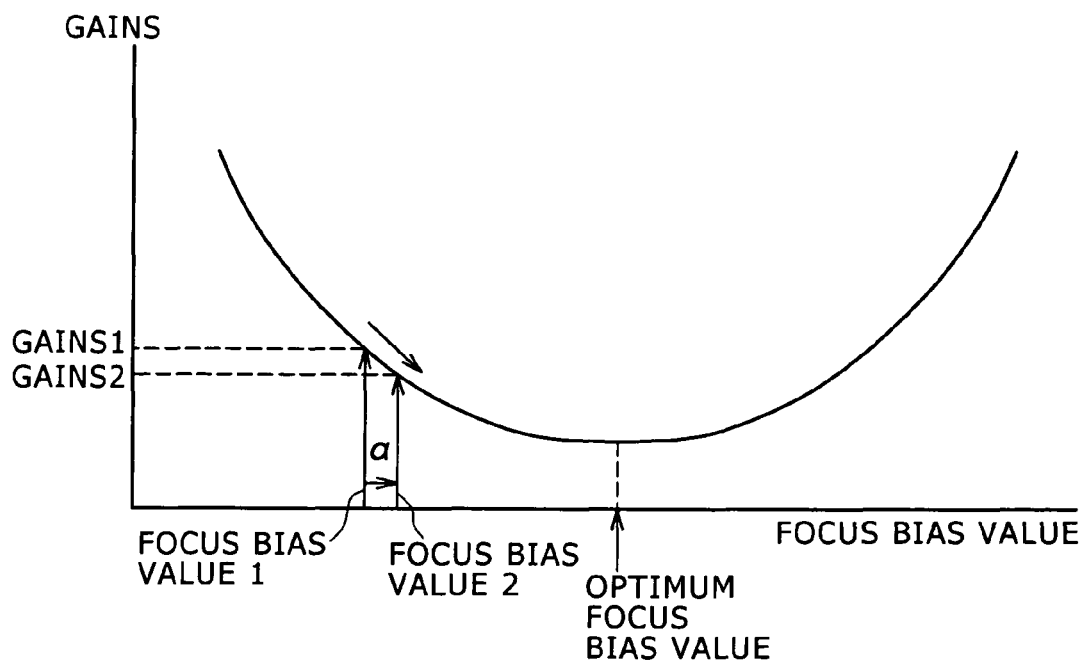
FIG. 6 is a bathtub curve showing relation between a focus bias value and the value of an amplitude control signal.

The GAINS generating section 311 generates the amplitude control signal GAINS corresponding to the focus bias value using the amplitude control value obtained in the AGC feedback loop provided for AGC control of the input RF signal and the bathtub curve (referred to also as the characteristic curve) shown in FIG. 6.

The optimum focus bias value generating section 312 for example changes a focus bias value corresponding to GAINS1 by an arbitrary value α (alpha), and obtains GAINS2 corresponding to this change on the bathtub curve. By repeating such an operation, an optimum focus bias value indicating an extremum (a minimum value or a maximum value) is obtained from the slope of the bathtub curve at a newly set GAINS point and the rate of change of α.

The focus error generating section 313 corresponds to the FE arithmetic section 203 in FIG. 4. The focus error generating section 313 generates the focus error (FE) signal obtained by performing operation on the signals A, B, C, and D obtained by the OPU light receiving section 201.

The adder 314 subjects the focus bias value supplied from the optimum focus bias value generating section 312 and the focus error signal supplied from the focus error generating section 313 to addition processing. Thereby the focus control signal is generated.

The focus control signal generating section 315 generates the focus control signal using a difference between the focus bias value and the focus error signal which difference is obtained in the adder 314.

The focus driving circuit 33A amplifies the focus control signal to a signal level capable of driving the OPU 30 including the objective lens 31. The objective lens 31 is moved by the amplified control signal in a direction perpendicular to the plane of rotation of the optical disk 11 to attain focus.

[Operation of Focus Bias Adjusting System]

A focus bias adjusting method (operation) during the reproduction of the recording and reproducing device will next be described.

The GAINS generating section 311 generates the amplitude control signal GAINS corresponding to the focus bias value from the amplitude control value obtained in the AGC feedback loop for performing AGC control of the input RF signal using the bathtub curve shown in FIG. 6. The optimum focus bias value generating section 312 changes a focus bias value corresponding to GAINS1 by a perturbation value α (alpha), and obtains GAINS2 corresponding to this change on the bathtub curve. By repeating such an operation, an extremum is obtained from the slope of the bathtub curve at a newly set GAINS point and the rate of change of α as described above. The extremum is set as an optimum focus bias value.

The focus error generating section 313 generates the focus error signal from the signals A to D obtained by the OPU light receiving section 201. The focus bias value supplied from the optimum focus bias value generating section 312 and the focus error signal are subjected to addition processing. Thereby, the focus control signal is generated. The servo filter and servo amplifier 315 generates a final focus control signal using the focus control signal. The focus driving circuit 33A moves the objective lens 31 in the direction perpendicular to the plane of rotation of the optical disk 11 by a control signal obtained by amplifying the focus control signal. Thereby focus is attained.

Thus, in the present embodiment, FE adjustment is made using the amplitude control signal for controlling the RF signal, the amplitude control signal being derived from the AGC feedback loop. As a result, the optimum focus bias value is a focus bias value maximizing the input RF signal, that is, minimizing the amplitude control signal (value) GAINS.

Figure 7:
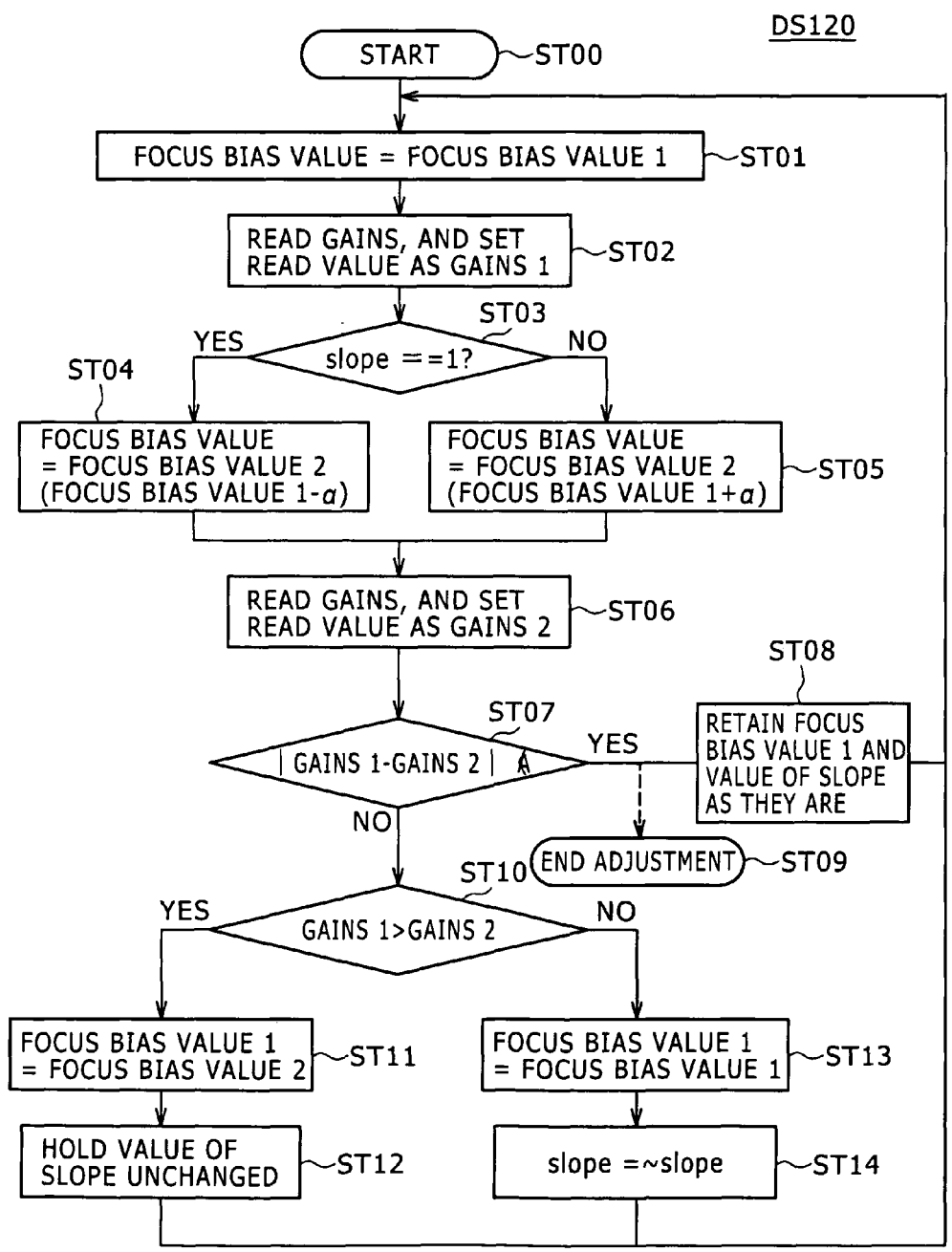
FIG. 7 is a flowchart of assistance in explaining control operation.

A concrete focus bias adjusting method will next be shown with reference to FIG. 6 and FIG. 7.

FIG. 6 shows a bathtub curve. Letting an axis of abscissas represent the focus bias value and letting an axis of ordinates represent the amplitude control signal (value) GAINS, a bathtub curve is generally described with respect to variation in the focus bias value. This bathtub curve for example has a downwardly projected curve. A minimum value of the curve is an optimum focus bias value. While this bathtub curve can be stored in a ROM or the like as disclosed in the Patent Document 1, it is also possible to obtain a part of the bathtub curve sequentially by the DSP 120 and use the part of the bathtub curve.

FIG. 7 is a flowchart of assistance in explaining a control operation. The operation shown in the following can be realized by the DSP 120, but is not limited to this; a part of the operation can be realized by hardware.

In this control operation, the focus bias value is obtained from the amplitude control signal GAINS on the bathtub curve so as to maximize the RF amplitude (minimize GAINS).

In step ST00, a control operation for controlling a focus error is started.

In step ST01, a focus bias value 1 is replaced with a focus bias value on the bathtub curve shown in FIG. 6.

In step ST02, GAINS on the bathtub curve which value corresponds to the focus bias value obtained in step ST01 is read, and the value is set as GAINS1.

In step ST03, a slope at GAINS1 on the bathtub curve is obtained, and the slope is determined. For example, in the case of the curve shown in FIG. 6, a transition is made to step ST04 when the slope is +1 (Yes), and a transition is made to step ST05 when the slope is −1 (No).

In step ST04, a bias is changed from the focus bias value 1 in a minus direction by a perturbation value α (alpha) (focus bias value 1−α), and the resulting value is set as a focus bias value 2. Then a transition is made to next step ST06.

In step ST05, on the other hand, the bias is changed from the focus bias value 1 in a plus direction by the perturbation value α (alpha) (focus bias value 1+α), and the resulting value is set as a focus bias value 2. Then a transition is made to next step ST06.

In step ST06, GAINS corresponding to the focus bias value 2 is obtained from the bathtub curve, and the value is set as GAINS2.

In step ST07, the absolute value of a difference between GAINS1 and GAINS2 is compared with a threshold value A. When a result of the comparison shows that the absolute value is larger than the threshold value A (No), a transition is made to step ST10. When the absolute value is smaller than the threshold value A, on the other hand, a transition is made to step ST08 or step ST09.

When the GAINS change obtained in step ST07 is smaller than the threshold value A, a transition is made to step ST08 or step ST09. A transition may be made to step ST09 to end the adjusting routine once the GAINS change becomes smaller than the threshold value, or the adjusting routine may be operated at all times by making a transition to step ST08 when the GAINS change is smaller than the threshold value.

In step ST09, the adjustment is ended because the amplitude control signal GAINS is an extremum or in the vicinity of the minimum value on the bathtub curve or within that region.

In step ST08, the focus bias value 1 and the value of the slope are retained as they are, and a transition is made to step ST01.

In step ST10, GAINS1 and GAINS2 are compared with each other to determine which of GAINS1 and GAINS2 is larger. When GAINS1 is larger than GAINS2 (Yes), a transition is made to step ST11. When GAINS1 is smaller than GAINS2 (No), a transition is made to step ST13.

In step ST11, the focus bias value 2 is set as the focus bias value 1. A transition is then made to step ST12.

In step ST12, the value of the slope is retained as it is, and a transition is made to step ST01.

In step ST13, on the other hand, the focus bias value 1 is set as the focus bias value 1. A transition is then made to step ST14.

In step ST14, the sign of the slope is inverted. For example, +1 is changed to −1. A transition is then made to step ST01.

Thereafter a similar operation is repeated according to the flowchart of FIG. 7.

As described above, the focus bias value is changed by a relatively small value (perturbation value α), and the value of GAINS at the time of the change is obtained. When the GAINS change is smaller than a certain value (threshold value A in FIG. 7), it is determined that the focus bias value has become an optimum focus bias value, and the adjustment is ended. Otherwise, the adjustment is continued without the focus bias value and the slope value being updated. When the GAINS change is larger than the threshold value A, the focus bias value is updated to such a value as to decrease GAINS, and the adjustment is continued according to the flowchart.

The focus bias value in step ST09 of the above-described flowchart is a value around a minimum value in the case of the downwardly projected curve of the bathtub curve in FIG. 6.

When the focus bias value is greatly changed by setting the perturbation value α large, GAINS changes greatly depending on the characteristic of the bathtub curve, and correspondingly a state of reproduction changes greatly. Therefore the focus bias value cannot be changed greatly during reproduction. The perturbation value α in FIG. 6 and FIG. 7 thus needs to be determined in such a range as not to affect the state of reproduction.

In addition, as a method of obtaining GAINS, a process of obtaining GAINS a number of times and averaging the values, for example, is performed when necessary. Thereby, even when variations occur in obtained GAINS value, minute variations are removed by the averaging. Therefore a stabilized operation is made possible.

The focus bias value thus obtained corresponds to a symbol −a of the FE Bias 210 in FIG. 4 described above, and also corresponds to the focus bias value output from the optimum focus bias value generating section 312 in FIG. 5.

Further, methods of making focus bias adjustment during reproduction include a method of making the adjustment at all times and a method of setting a threshold value and making the adjustment when the threshold value is exceeded. In the latter case, a threshold value is provided for GAINS on the bathtub curve, and GAINS on the bathtub curve is read out by the DSP and the operation of the bias adjustment is started when the threshold value is exceeded.

Thus, the present embodiment can make focus bias adjustment during reproduction, and improve readability (reproduction performance). In addition, a focus error adjusting block can be configured mainly by a DSP, and implemented by only a small addition in terms of hardware.

Adjustment based on an AGC control value is an adjustment based on a relative value, and is a search for an extremum. Variation in AGC control value which variation is dependent on the device does not present a problem. Thus accurate adjustment can be made without depending on the device variation.

In the signal reproducing section of an optical disk reproducing device and an optical disk recording and reproducing device according to embodiments of the present invention, a gain controlled amplifier circuit for amplifying an RF signal generated from a light receiving element corresponds to the VCA (variably controlled amplifier circuit) 42. An AGC circuit for controlling a gain of the gain controlled amplifier circuit corresponds to the RFADC 43, the AGC control circuit 45, and the DAC 46. A signal processing section for generating a control signal for adjusting one of an optical system path and a detection system path for controlling the optical pickup unit using an AGC control value generated in the AGC circuit corresponds to the servo DSP 54 and the DAC 55.

The present embodiment is applicable to an optical disk reproducing device and an optical disk recording and reproducing device, and is particularly usable in a recording and reproducing device or a reproducing device for CD (Compact Disc), DVD, BD (Blu-ray Disc) and the like.

The present application contains subject matter related to that disclosed in Japanese Priority Patent Application JP 2009-170044 filed in the Japan Patent Office on Jul. 21, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical disk reproducing device comprising:
a signal reproducing section configured to read and decode information recorded on an optical disk by an optical pickup unit, and reproduce the information,
wherein said signal reproducing section includes
a gain controlled amplifier circuit configured to amplify an radio frequency signal generated from a light receiving element,
an automatic gain control circuit configured to control a gain of said gain controlled amplifier circuit, and
a signal processing section configured to derive a part of an automatic gain control value generated in said automatic gain control circuit, and generate a control signal for adjusting one of an optical system path and a detection system path for controlling said optical pickup unit,
wherein said signal processing section includes a digital arithmetic processing section configured to obtain a focus bias value from a characteristic curve relating a focus bias of the optical pickup unit and a controlling gain value corresponding to the automatic gain control value, the focus bias value being obtained by varying said focus bias to determine where the controlling gain value on the characteristic curve assumes an extremum and determining the focus bias value corresponding to the extremum,
wherein the signal processing section adjusts said optical pickup unit by further optimizing the focus bias value in correspondence with a perturbation value $\alpha$.

2. The optical disk reproducing device according to claim 1,
wherein adjustment of said optical pickup unit is made in a state of reproducing operation of said optical disk device being continued without being interrupted.

3. The optical disk reproducing device according to claim 1,
wherein adjusting one of said optical system path and said detection system path is focus bias adjustment.

4. The optical disk reproducing device according to claim 1,
wherein said automatic gain control value is generated on a basis of a difference between a difference signal between a peak value and a bottom value of an output signal output from said gain controlled amplifier circuit and a target radio frequency amplitude value for focus.

5. The optical disk reproducing device according to claim 1,
wherein the digital arithmetic processing section obtains the focus bias from said characteristic curve a plurality of times, averages the obtained focus biases, and sets the averaged focus bias as a focus bias for adjusting said optical pickup unit.

6. The optical disk reproducing device according to claim 1,
wherein the extremum on said characteristic curve is obtained using said focus bias value on said characteristic curve and a slope of said characteristic curve by using said digital arithmetic processing section.

7. An optical disk recording and reproducing device comprising:
a signal recording section configured to write encoded information to an optical disk by an optical pickup unit; and
a signal reproducing section configured to read and decode information recorded on said optical disk and reproduce the information;
wherein said signal reproducing section includes
a gain controlled amplifier circuit configured to amplify an radio frequency signal generated from a light receiving element,
an automatic gain control circuit configured to control a gain of said gain controlled amplifier circuit, and
a signal processing section configured to derive a part of an automatic gain control value generated in said automatic gain control circuit, and generate a control signal for adjusting one of an optical system path and a detection system path for controlling said optical pickup unit,
wherein said signal processing section includes a digital arithmetic processing section configured to obtain a focus bias value from a characteristic curve relating a focus bias of the optical pickup unit and a controlling gain value corresponding to the automatic gain control value, the focus bias value being obtained by varying said focus bias to determine where the controlling gain value on the characteristic curve assumes an extremum and determining the focus bias value corresponding to the extremum,
wherein the signal processing section adjusts said optical pickup unit by further optimizing the focus bias value in correspondence with a perturbation value $\alpha$.

8. The optical disk recording and reproducing device according to claim 7,
wherein adjustment of said optical pickup unit is made in a state of reproducing operation of said optical disk device being continued without being interrupted.

9. The optical disk recording and reproducing device according to claim 7,
wherein adjusting one of said optical system path and said detection system path is focus bias adjustment.

10. The optical disk recording and reproducing device according to claim 7,
wherein the extremum on said characteristic curve is obtained using said focus bias value on said characteristic curve and a slope of said characteristic curve by using said digital arithmetic processing section.

11. An optical disk reproducing device comprising:
signal reproducing means for reading and decoding information recorded on an optical disk by an optical pickup unit, and reproducing the information,
wherein said signal reproducing means includes
a gain controlled amplifier circuit for amplifying an radio frequency signal generated from a light receiving element,
an automatic gain control circuit for controlling a gain of said gain controlled amplifier circuit, and
signal processing means for deriving a part of an automatic gain control value generated in said automatic gain control circuit, and generating a control signal for adjusting one of an optical system path and a detection system path for controlling said optical pickup unit,
wherein said signal processing means includes a digital arithmetic processing section configured to obtain a focus bias value from a characteristic curve relating a focus bias of the optical pickup unit and a controlling gain value corresponding to the automatic gain control value, the focus bias value being obtained by varying said focus bias to determine where the controlling gain value on the characteristic curve assumes an extremum and determining the focus bias value corresponding to the extremum, wherein the signal processing means adjusts said optical pickup unit by further optimizing the focus bias value in correspondence with a perturbation value α.

12. An optical disk recording and reproducing device comprising:

signal recording means for writing encoded information to an optical disk by an optical pickup unit; and signal reproducing means for reading and decoding information recorded on said optical disk and reproducing the information;

wherein said signal reproducing means includes a gain controlled amplifier circuit for amplifying an radio frequency signal generated from a light receiving element, an automatic gain control circuit for controlling a gain of said gain controlled amplifier circuit, and signal processing means for deriving a part of an automatic gain control value generated in said automatic gain control circuit, and generating a control signal for adjusting one of an optical system path and a detection system path for controlling said optical pickup unit, wherein said signal processing means includes a digital arithmetic processing section configured to obtain a focus bias value from a characteristic curve relating a focus bias of the optical pickup unit and a controlling gain value corresponding to the automatic gain control value, the focus bias value being obtained by varying said focus bias to determine where the controlling gain value on the characteristic curve assumes an extremum and determining the focus bias value corresponding to the extremum, wherein the signal processing means adjusts said optical pickup unit by further optimizing the focus bias value in correspondence with a perturbation value α.

* * * * *